Patented June 30, 1953

2,643,948

UNITED STATES PATENT OFFICE 2,643,948

METHOD OF PRODUCING A FERTILIZER FROM PHOSPHATE ROCK

Maurice Sourdet, Paris, France, assignor to Societe d'Etudes Chimiques Pour l'Industrie et l'Agriculture, Paris, France, a corporation of France No Drawing. Application March 24, 1950, Serial No. 151,803. In France March 28, 1949

4 Claims. (Cl. 71—46)

This invention relates to the fabrication of phosphated fertilizers and to the fertilizers produced.

It is known how to treat natural phosphates containing fluorine by melting or sintering them in the presence of silica in order to de-fluorinate them and obtain products containing tri-calcium phosphate in admixture or in solid solution with silicates of lime. This treatment however requires the use of elevated temperatures if products are to be obtained that have high solubility in 2% citric acid and in ammonium citrate, the test generally prescribed in official specifications. Depending on the raw material treated and the specific procedure followed, operating temperatures as high as 1500 to 1600° C. may have to be used. Because of these high temperatures, difficult engineering problems are encountered in the practical embodiment of such methods and this condition is further aggravated by the increased aggressivity of the substances undergoing treatment in such a high temperature range.

It is further known how to obtain, from the same natural phosphates, products that generally comprise mixtures or solid solutions of double calcium and alkali metal phosphates and calcium silicates, in which the active constituent $P_2O_5$ is highly soluble in ammonium citrate solutions. This method can be carried out at temperatures in the range of 1100–1200° C. in the presence of an alkaline product having known caustic and fusing properties (hereinafter called "alkali reagent") such as an alkaline carbonate, an alkali sulfate etc., alone or in admixture with suitable substances for enhancing its activity. This method however, though easier to carry out on an industrial scale than the former, has the drawback of requiring the use of an expensive alkaline product; moreover, the active alkaline constituent of the alkali reagent, which is recovered in combined form in the finished product, can in some cases, be quite devoid of any inherent fertilizing action of its own, and must therefore be considered as a net loss.

It is an object of this invention to provide a method of producing phosphated fertilizers which are free of any of the above drawbacks. The improved method essentially comprises, in a first step, reacting the natural phosphates at a temperature of about 1100° C. to 1200° C. in the presence of an alkaline product having known caustic and fusing properties thereby to obtain double calcium and alkali metal phosphates, possibly in admixture or in solid solution with silicates of lime, said alkali reagent being suitably selected to allow total recovery of the alkaline constituent in the second step of manufacture of the phosphated fertilizer. During this operation, the fluorine is discharged and may be recovered in any suitable way. In a second step of the process, the reaction products from the first step are hydrolised and there is obtained: in the first place a solid fraction comprizing a practically completely defluorinated phosphate of lime, more or less combined and/or mixed with silicates of lime, having high solubility in 2% citric acid and in ammonium citrate, and providing a valuable fertilizer; and in the second place, a concentrated solution of an alkaline base or an alkali salt in the event the hydrolysis was carried out in the presence of an acid such as carbonic acid for instance. The initial alkaline constituent is recovered from this concentrated solution.

The alkali reagent used in the method can comprise any of the usual alkaline compounds having known caustic and fusing properties, such as an alkaline carbonate, sulfide or silicate, and under certain circumstances, an alkaline chloride.

It should be noted however that the hydrolysis of the products resulting from the first step is more complete and is accomplished with greater ease if the alkali reagent used is a caustic or fusing derivative of potassium. Since the substance used is recovered in the second step of the process there is no objection in employing an expensive salt as the alkali reagent.

The method of the invention further includes an additional and new advantage. Namely, it is well known that it is possible to use, as the alkali reagent for natural phosphates, by-products of other industries having suitable alkaline content. The use of the method of the invention makes it possible in this way to employ such by-products while recovering the valuable alkaline constituent contained in them. This especially applies to the by-products of the iron industry and other metallurgical processes, for instance, the potassic slag obtained in the de-sulfurization of crude iron.

According to the invention, this slag is utilized as the alkali reagent in the first step of the process; in the second step, hydrolysis of the products resulting from the first step yields a very valuable phosphated fertilizer and a concentrated potash solution which the method thus makes available by cheap recovery from the slag used.

The second step of the method may be conducted in various ways, due to the possible presence of acid anhydrides or of alkalis such as $CO_2$ or $Ca(OH)_2$, etc. Hydrolysis of the products obtained in the first step is effected at moderate temperatures, ranging from the surrounding temperature up to 100° C.

The following example will illustrate the invention but should not be construed as restricting it in any way.

Example.—To 100 parts of natural phosphate (containing 38.9% $P_2O_5$), and 18 parts silica, 63 parts of potassium carbonate are added. The mixture of raw materials is ground to a fine particle size and intimately mixed; the ground mixture is then heated within the range 1150° C.–1200° C. for three hours. The resulting product is ground and passed through a 100-mesh sieve. A suitable amount of lime (5 parts CaO) is added; the resulting product is methodically extracted with water at a temperature of 100° C. On completion of this operation, there is obtained a solid no longer containing potassium and providing a phosphated fertilizer highly soluble in 2% citric acid (95% solubility of the total $P_2O_5$) and equally soluble in ammonium citrate; and a concentrated caustic potash solution containing about 200 grams $K_2O$ per liter. The potash recovered from this solution by conventional methods can be re-used to disaggregate a fresh charge of natural phosphate under similar conditions, as the potassium carbonate previously described.

What I claim is:

1. Method of treating natural phosphates for the production of phosphate fertilizers, which comprises heating the natural phosphate in a temperature range of 1100° C. to 1200° C. with an alkali metal salt to obtain a double calcium and alkali metal phosphate, hydrolyzing the said double phosphate to obtain a calcium phosphate fertilizer having high solubility in citric acid solutions, and a concentrated alkaline solution, and recovering the content of the alkali metal compound present in said alkaline solution.

2. Method of treating natural phosphates for the production of phosphate fertilizers, which comprises heating the natural phosphate in a temperature range of 1100° C. to 1200° C. with an alkali metal compound selected from the class consisting of caustic alkali metal compounds that may be readily separated from their concentrated aqueous solutions, to obtain a double calcium and alkali metal phosphate, hydrolyzing the said double phosphate to obtain a calcium phosphate fertilizer having high solubility in citric acid solutions, and a concentrated alkaline solution, and recovering the content of the alkali metal compound present in said alkaline solution.

3. Method as in claim 2, wherein the alkali metal compound is a potassium compound.

4. Method as in claim 3, wherein the alkali metal compound is the postassium slag from an iron desulfurizing process.

MAURICE SOURDET.

References Cited in the file of this patent

UNITED STATES PATENTS

| Number | Name | Date |
|---|---|---|
| 1,144,405 | Willson et al. | June 29, 1915 |
| 1,282,385 | Delacourt | Oct. 22, 1918 |

FOREIGN PATENTS

| Number | Country | Date |
|---|---|---|
| 2,983 | Great Britain | 1856 |
| 461,869 | Great Britain | Feb. 25, 1937 |